US008105688B2

(12) United States Patent
Liu

(10) Patent No.: US 8,105,688 B2
(45) Date of Patent: Jan. 31, 2012

(54) INORGANIC SOLID-PHASE COMBINED POWDER, MASTER BATCH AND METHOD FOR MANUFACTURING THE SAME, FIBER AND METHOD FOR MANUFACTURING THE SAME

(76) Inventor: Yanping Liu, Beijing (CN)

( * ) Notice: Subject to any disclaimer, the term of this patent is extended or adjusted under 35 U.S.C. 154(b) by 170 days.

(21) Appl. No.: 12/406,886

(22) Filed: Mar. 18, 2009

(65) Prior Publication Data

US 2009/0241504 A1 Oct. 1, 2009

(30) Foreign Application Priority Data

Mar. 28, 2008 (CN) .......................... 2008 1 0103008

(51) Int. Cl.
*D02G 3/00* (2006.01)
*C08K 3/10* (2006.01)
*A01N 25/00* (2006.01)
(52) U.S. Cl. ........ 428/364; 428/372; 428/357; 524/413; 524/415; 524/434; 524/450; 424/405; 424/401; 424/409
(58) Field of Classification Search .................. 428/370, 428/357, 221, 364, 372; 442/123; 423/598, 423/326, 594.1, 622, 623, 409, 421; 424/401, 424/404, 405, 421, 59, 65–68, 400, 409, 424/411–414, 603, 638, 641, 616–618
See application file for complete search history.

(56) References Cited

U.S. PATENT DOCUMENTS

| 4,849,223 A * | 7/1989 | Pratt et al. ...................... 424/409 |
| 5,047,488 A * | 9/1991 | Nogues et al. ................... 526/65 |
| 5,180,585 A * | 1/1993 | Jacobson et al. ............... 424/405 |
| 5,464,695 A * | 11/1995 | Kawamoto et al. ........... 428/370 |
| 5,730,995 A * | 3/1998 | Shirono et al. ................ 424/404 |
| 7,186,393 B2 * | 3/2007 | Kogoi et al. ................... 423/326 |

* cited by examiner

*Primary Examiner* — Jennifer Chriss
*Assistant Examiner* — Altrev Sykes
(74) *Attorney, Agent, or Firm* — J.C. Patents

(57) ABSTRACT

The present invention relates to an inorganic solid-phase combined powder, a master batch and a method for manufacturing the same, a fiber and a method for manufacturing the same. The fiber manufactured by the above method includes the following constituents in percentage by weight: 10-20% the master batch and 80-90% the high polymer carrier section. Silver content in the fiber of the present invention can reach up to 3-10%, the bactericidal rate is high, the blocking rate against ultraviolet ray is high, the efficacy is perdurable and safe, and there is no toxic or side effects. The spinnability of the fiber is good. The water absorption, permeability, dyeing evenness and electrical conductivity of the fiber are improved greatly, and the drapability and comfortableness are increased when the textile of the fiber is worn.

7 Claims, 3 Drawing Sheets

INORGANIC SOLID-PHASE COMBINED POWDER, MASTER BATCH AND METHOD FOR MANUFACTURING THE SAME, FIBER AND METHOD FOR MANUFACTURING THE SAME

CROSS-REFERENCE TO RELATED APPLICATIONS

This application claims priority to Chinese Patent Application No. 200810103008.5, filed on Mar. 28, 2008, entitled "Inorganic Solid-Phase Combined Powder, Master Batch and Method for Manufacturing the same, Fiber and Method for Manufacturing the same", which is incorporated herein by reference in its entirety.

FIELD OF THE TECHNOLOGY

The present invention relates to fiber and a method for manufacturing the same, and particularly to inorganic solid-phase combined powder, master batch using the inorganic solid-phase combined powder and a method for manufacturing the same, and a fiber using the master batch and a method for manufacturing the same.

BACKGROUND

Along with continuous improvement of the living standards, the purpose of wearing is not only to cover and warm bodies purely, the requirement on the healthy function of the costumes is getting more and more urgent, and the market space is getting wider. Especially in summer, some obstinate fungus may easily breed and pollute several parts of the body, besides negative bacteria and positive bacteria represented by *staphylococcus aureus* and *escherichia coli* may easily breed in the body, which are difficult to overcome. In addition, the ultraviolet ray with 200-400 nm wavelength irradiates the body for a long time, which may cause some diseases such as dermatitis, cutaneous carcinoma and cataract. Thus people always desire to wear costumes which could effectively prevent bacterial invasion and ultraviolet injury.

As a fiber is a basic unit to form cloth, many researchers focus on how to manufacture a fiber with complex functions of anti-bacterium and ultravioresistance. An existing method is to simply coat substances with complex functions of anti-bacterium and ultravioresistance onto the surface of a fiber, and the functional fiber manufactured by means of the above method has the following deficiencies:

(1) The efficiency is unobvious. Silver ion has a bactericidal efficacy. As there is no silver ion in the fiber or the content of silver ion is very low, the bactericidal rate of the fiber is low, and there is no obvious efficacy to fungus represented by *candida albicans*. The blocking rate against the ultraviolet ray with 200-400 nm wavelength is not high, the skin of peoples will be injured when the ultraviolet ray irradiates for a long time;

(2) The efficacy could only last for a short time. As the substance having complex functions of anti-bacterium and ultravioresistance is only coated on the surface of the fiber simply, and is not fused into the fiber, the functional substance is easily volatilized or chipped off, which causes the activation of the substance decreases, even the substance will lose effectiveness.

SUMMARY OF THE INVENTION

The subject of the present invention is to provide an inorganic solid-phase combined powder, a master batch and a method for manufacturing the same, a fiber and a method for manufacturing the same to overcome the technical efficiencies such as unobvious efficacy and short efficacy of the fiber in prior art.

In order to realize above subject, the present invention provides an inorganic solid-phase combined powder including the following constituents in percentage by weight: 13-16% titanium compound, 16-18% silicon compound, 15-22% zinc compound and 49-51% silver compound.

Preferably, the titanium compound is titanium dioxide with 15% by weight; the silicon compound is silicon dioxide with 17% by weight; the zinc compound is zinc oxide with 18% by weight; and the silver compound is silver nitrate with 50% by weight.

The present invention also provides a master batch using the inorganic solid-phase combined powder. The master batch includes the following constituents in percentage by weight: 20-35% the inorganic solid-phase combined powder and 64-79% high polymer carrier section.

The high polymer carrier section is a nylon dry section, a polypropylene section or a polyester dry section.

The present invention also provides a method for manufacturing the master batch, and the method includes the following steps:

dewatering and activating the inorganic solid-phase combined powder;

heating and stirring the inorganic solid-phase combined powder dewatered and activated;

adding interface reaction active agent, the high polymer carrier section, oxidation-resistant and heat-resistant agent, and dispersant in sequence during stirring to form a mixture; and cooling the mixture.

The step of dewatering and activating the inorganic solid-phase combined powder specifically includes: venting air to dry the inorganic solid-phase combined powder at 110-120° C. for 50-70 minutes, venting air to dry the inorganic solid-phase combined powder at 120-130° C. for 50-70 minutes and venting air to dry the inorganic solid-phase combined powder at 130-140° C. for 110-130 minutes in sequence.

The step of heating and stirring the inorganic solid-phase combined powder dewatered and activated specifically includes the following steps:

putting the inorganic solid-phase combined powder dewatered and activated into a stirrer;

heating the inorganic solid-phase combined powder to 130-150° C.;

stopping heating after stirring for 4-6 minutes under a condition of 130-150° C. and 1300 rpm; and continuing stirring until the temperature of the inorganic solid-phase combined powder falls to 115-125° C.

The step of adding the interface reaction active agent, the high polymer carrier section, the oxidation-resistant and heat-resistant agent, and the dispersant in sequence during stirring includes the following steps:

adding interface reaction active agent under a condition of 115-125° C. and 200 rpm, and stirring for 2.5-3.5 minutes at 1300 rpm;

adding the high polymer carrier section under a condition of 115-125° C. and 200 rpm, and stirring for 5-7 minutes at 1300 rpm;

adding the oxidation-resistant and heat-resistant agent under a condition of 115-125° C. and 200 rpm, and stirring for 2.5-3.5 minutes at 1300 rpm; and adding the dispersant under a condition of 115-125° C. and 200 rpm, and stirring for 2.5-3.5 minutes at 1300 rpm.

Preferably, the interface reaction active agent is silane-terminated coupling agent with a weight percentage of 0.4-2.0% in the master batch. The high polymer carrier section is a nylon dry section, a polypropylene section or a polyester dry section with a weight percentage of 64-79% in the master batch. The oxidation-resistant and heat-resistant agent is trialkyl phosphate with a weight percentage of 0.236-0.474% in the master batch. The dispersant is macromolecule wax with a weight percentage of 1.18-4.74% in the master batch.

The step of cooling the mixture specifically includes the following steps:

cooling the mixture in a water-cooled stirrer to less than 35° C.; and squeezing the cooled mixture to be strip at 220-26° C., and cooling it in water bath at 30-38° C. to manufacture the master batch.

After cooling the mixture, the method further includes: drying the master batch at 110-130° C. and executing a vacuum balance for 2-3 hours to make the weight proportion of the water in the master batch less than or equal to five per ten thousand.

The present invention also provides a fiber using the master batch. The fiber includes the following constituents in percentage by weight: 10-20% the master batch and 80-90% the high polymer carrier section.

Preferably, the weight percentage of the master batch is 10%, the weight percentage of the high polymer carrier section is 90%.

The high polymer carrier section is a nylon dry section, a polypropylene section or a polyester dry section.

The present invention also provides a method for manufacturing the fiber, and the method includes the following steps:

mixing and melting the master batch and the high polymer carrier section, executing a cooling to form a high-speed spinning pre-oriented yarn (POY) fiber after spinning, and oiling the high-speed spinning pre-oriented yarn fiber; and manufacturing the oiled high-speed spinning pre-oriented yarn fiber into a draw textured yarn (DTY) fiber by means of an inner drafting heating false twisting method, and oiling the draw textured yarn fiber.

The step of mixing and melting the master batch and the high polymer carrier section, executing a cooling to form a high-speed spinning pre-oriented yarn fiber after spinning, and oiling the high-speed spinning pre-oriented yarn fiber specifically includes:

mixing the master batch and the high polymer carrier section at a ratio of 1:9-2:8 by weight, melting them at 255-265° C. to form a melt;

spinning the melt at 3900-4300 meters/minute, and then cooling the strand silk with humidity of more than 70% and temperature of 18-22° C. to form the high-speed spinning pre-oriented yarn fiber; and oiling the high-speed spinning pre-oriented yarn fiber by using 7-9% oil by weight with respect to the high-speed spinning pre-oriented yarn fiber.

The high polymer carrier section is a nylon dry section, a polypropylene section or a polyester dry section.

The step of manufacturing the oiled high-speed spinning pre-oriented yarn fiber into a draw textured yarn fiber by means of an inner drafting heating false twisting method, and oiling the draw textured yarn fiber specifically includes: drafting the oiled high-speed spinning pre-oriented yarn fiber with draft multiple of 1.5-1.6, manufacturing the draw textured yarn fiber by means of the inner drafting heating false twisting method with D/Y ratio of 14-16, oiling the draw textured yarn fiber by using 2.5-3.5% oil by weight with respect to the draw textured yarn and at a spinning speed of 650-750 meters/minute.

The present invention provides an inorganic solid-phase combined powder, a master batch and a method for manufacturing the same, a fiber and a method for manufacturing the same, which have the following merits:

1, The efficacy is obvious. When the silver ions in the fiber are released gradually, the contact reaction of the silver ions and microorganisms such as bacteria and virus under coulomb attractive force is produced. The silver ions penetrate breathing system and substance transmission system of the microorganism to make thallus loose activity. Then the silver ions dissociate out from the thallus and kill the thallus repeatedly. The content of silver ions in the inorganic solid-phase combined powder of the present invention can reach up to 3-10%, thus the bactericidal rate is high, and the bactericidal rate against the negative bacteria and the positive bacteria, especially the bactericidal rate against the fungus represented by *candida albicans* can reach over 99.5%. The blocking rate against the ultraviolet ray with 200-400 nm wavelength can reach over 99.8%.

2, The efficacy is perdurable. In the present invention, the inorganic solid-phase combined powder having complex functions of anti-bacterium and ultravioresitancy is fused into the fiber at a certain ration by weigh. As the powder has a better thermal stability and chemical stability, does not dissolve during the process of high temperature spinning and does not react with fiber macro molecules and related additives, the inorganic solid-phase combined powder can be uniformly retained in the fiber for a long time, its efficacy is perdurable and safe and there is no toxic or side effects.

3, Dispersing is executed adequately. The present invention firstly dewaters and activates the inorganic solid-phase combined powder at a high temperature, stirs at a high temperature and a high speed immediately and then selects suitable interface reaction agent to make the surface of inorganic solid-phase combined powder particles be covered, so as to make a wrap angle between the high polymer and particle is extremely small, which advances dispersion of the inorganic solid-phase combined powder particles in organic macromolecule. Subsequently, a pathwise double-screw and a multi-layer composite mixing facility lying before screw die head are adopted to execute a mixing process by a mode of multi-way diffluence with a high melting pressure, which enhances the functions of kneading, cutting and multiple flowing on the inorganic solid-phase nanometer powder in the high polymer melt, so as to accomplish a high dispersion degree. Finally, high quality organic dispersant is adopted to further disperse, by adopting enhanced dispersing means for many times, the inorganic solid-phase combined powder could be dispersed adequately in organic macromolecule, and when the formed master batch is continuously and quantificationally added into spinning section to be spinned, it could be avoided to produce melt adhesive particles in melt, which makes high-speed spinning of functional fiber be executed smoothly.

4, During the process of manufacturing the master batch, oxidation-resistant and heat-resistant agent is added to prevent molecule weight of the high polymer from reducing, which enables relative viscosity of the master batch to reduce only 0.2-0.3. Then the master batch is added into the spinning melt, the total viscosity does not influence optimal liquidity of spinning by using special spinning techniques so as to spin smoothly at a spinning speed of 4300 meters/minutes.

5, The fiber of the present invention has a good spinnability. By detecting, indexes such as fiber number, fiber relative tensile value, fiber elongation percentage, fiber elastic elongation percentage and fiber elastic stable rate are consistent with first class quality in national professional standard of fibers.

6, As the blended inorganic solid-phase combined powder produces crannies around particles of the fiber, the water absorption, permeability, dyeing evenness and electrical conductivity of the fiber in the present invention are improved greatly, and the drapability and comfortableness are increased when the textile of the fiber is worn. In addition, the fiber of the present invention could be taken as fiber material of textiles such as weaving cloth (including shuttle or non-shuttle weaving cloth) and warp knitting cloth. The fiber could be used separately, and could be interwoven by combining with gauze and fibers such as cotton, hemp and artificial cotton at a certain ratio.

The present invention will be described in more detail with reference to the drawings and embodiments.

DETAILED DESCRIPTION OF THE PREFERRED EMBODIMENTS

The inorganic solid-phase combined powder of the present invention will be described in more detail with reference to the embodiments.

The first embodiment of the inorganic solid-phase combined powder in the present invention The inorganic solid-phase combined powder includes the following constituents in percentage by weight: 15% titanium compound, 17% silicon compound, 18% zinc compound and 50% silver compound.

The second embodiment of the inorganic solid-phase combined powder in the present invention.

The inorganic solid-phase combined powder includes the following constituents in percentage by weight: 13% titanium compound, 16% silicon compound, 22% zinc compound and 49% silver compound.

The third embodiment of the inorganic solid-phase combined powder in the present invention.

The inorganic solid-phase combined powder includes the following constituents in percentage by weight: 16% titanium compound, 18% silicon compound, 15% zinc compound and 51% silver compound.

In the above first embodiment, the second embodiment and the third embodiment of the inorganic solid-phase combined powder in the present invention, the titanium compound is preferably titanium dioxide, the silicon compound is preferably silicon dioxide, the zinc compound is preferably zinc oxide, and the silver compound is preferably silver nitrate.

It can be seen from the first embodiment, the second embodiment and the third embodiment of the inorganic solid-phase combined powder according to the present invention, compared with the prior art, the content of the silver in the inorganic solid-phase combined powder can reach up to 3-10% so that the present invention has a high bactericidal rate, and the bactericidal rate against the negative bacteria and the positive bacteria, especially the bactericidal rate against the fungus represented by *candida albicans* can reach over 99.5%; and the blocking rate against the ultraviolet ray with 200-400 nm wavelength can reach over 99.8%. Besides, the inorganic solid-phase combined powder has better thermal stability and chemical stability, does not dissolve during the process of high temperature spinning and does not react with fiber macro molecules and related additives so that the inorganic solid-phase combined powder can be uniformly retained in the fiber for a long time, its efficacy is perdurable and safe and there is no toxic or side effects.

Figure 1:
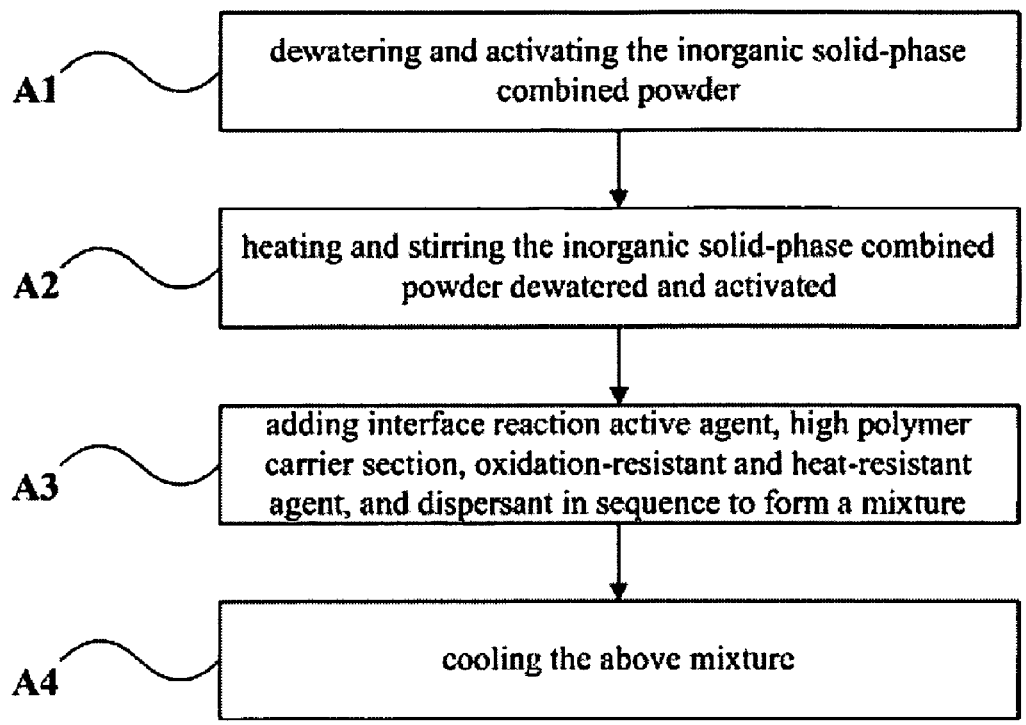
FIG. 1 is a flow chart of a method for manufacturing the master batch according to the present invention.

FIG. 1 is a flow chart of the method for manufacturing the master batch according to the present invention, and the method specifically includes the following steps:

Step A1, dewatering and activating inorganic solid-phase combined powder;

Step A2, heating and stirring the inorganic solid-phase combined powder dewatered and activated;

Step A3, adding interface reaction active agent, high polymer carrier section, oxidation-resistant and heat-resistant agent, and dispersant during stirring, to form a mixture; and Step A4, cooling the above mixture.

Figure 2:
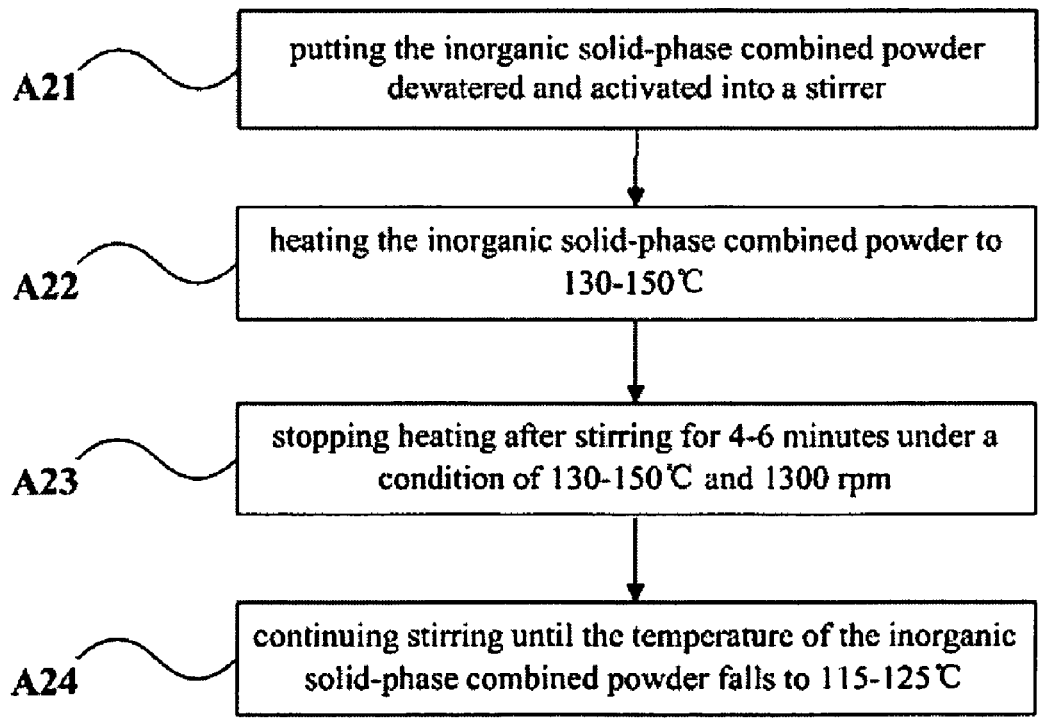
FIG. 2 is a flow chart of heating and stirring the inorganic solid-phase combined powder dewatered and activated according to the present invention.

FIG. 2 is a flow chart of heating and stirring the inorganic solid-phase combined powder dewatered and activated according to the present invention. In the technical solution shown in FIG. 1, the step A2 specifically includes the following steps:

Step A21, putting the inorganic solid-phase combined powder dewatered and activated into a stirrer;

Step A22, heating the inorganic solid-phase combined powder to 130-150° C.;

Step A23, stopping heating after stirring for 4-6 minutes under the condition of 130-150° C. and 1300 rpm; and Step A24, continuing stirring until the temperature of the inorganic solid-phase combined powder falls to 115-125° C.

Figure 3:
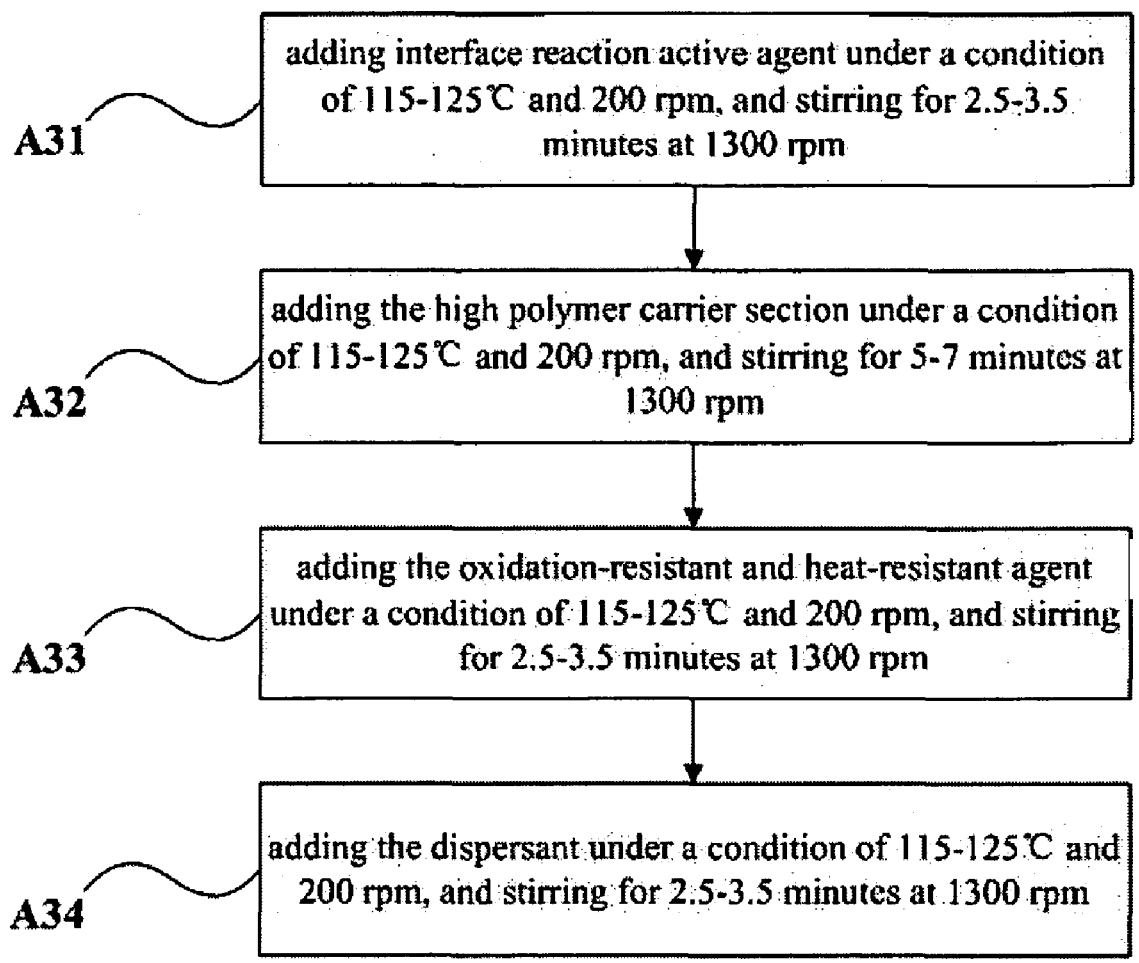
FIG. 3 is a flow chart of adding interface reaction active agent, high polymer carrier section, oxidation-resistant and heat-resistant agent, and dispersant in sequence to form a mixture according to the present invention.

FIG. 3 is a flow chart of adding interface reaction active agent, high polymer carrier section, oxidation-resistant and heat-resistant agent, and dispersant during stirring to form a mixture according to the present invention. In the technical solution shown in FIG. 1, the step A3 specifically includes the following steps:

Step A31, adding interface reaction active agent under a condition of 115-125° C. and 200 rpm, and stirring for 2.5-3.5 minutes at 1300 rpm;

Step A32, adding the high polymer carrier section under a condition of 115-125° C. and 200 rpm, and stirring for 5-7 minutes at 1300 rpm;

Step A33, adding the oxidation-resistant and heat-resistant agent under a condition of 115-125° C. and 200 rpm, and stirring for 2.5-3.5 minutes at 1300 rpm; and Step A34, adding the dispersant under a condition of 115-125° C. and 200 rpm, and stirring for 2.5-3.5 minutes at 1300 rpm.

Figure 4:
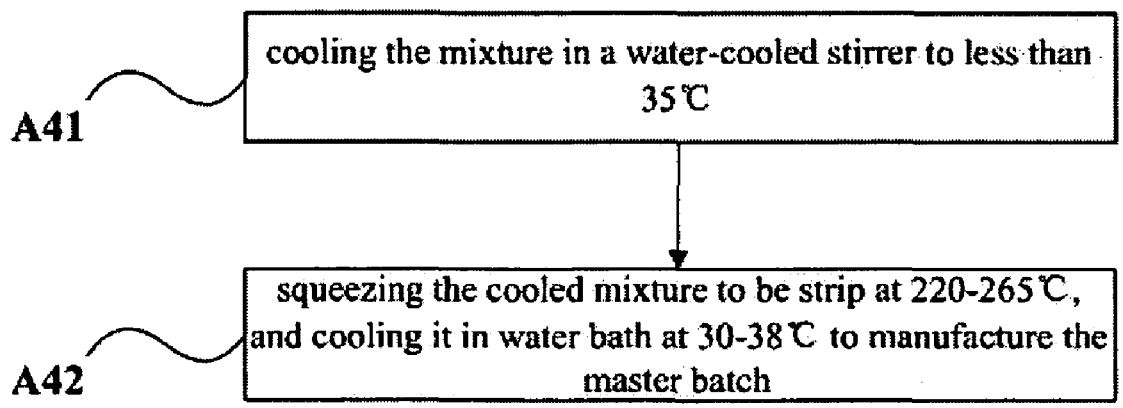
FIG. 4 is a flow chart of cooling the mixture.

FIG. 4 is a flow chart of cooling the mixture according to the present invention. In the technical solution shown in FIG. 1, the step A4 specifically includes the following steps:

Step A41, cooling the mixture in a water-cooled stirrer to less than 35° C.; and Step A42, squeezing the cooled mixture to be strip at 220-265° C., and cooling it in water bath at 30-38° C. to manufacture the master batch.

A first embodiment of the method for manufacturing the master batch according to the present invention includes the following steps:

Step A101, putting 6000 grams of inorganic solid-phase combined powder into an oven, venting air to dry the inorganic solid-phase combined powder at 110° C. for 70 minutes, venting air to dry the inorganic solid-phase combined powder at 120° C. for 70 minutes and then venting air to dry the inorganic solid-phase combined powder at 130° C. for 130 minutes in sequence;

Step A102, putting the above inorganic solid-phase combined powder after being dewatered and activated into a stirrer;

Step A103, heating the inorganic solid-phase combined powder to 130° C.;

Step A104, stirring for 6 minutes under a condition of 130° C. and 1300 rpm and then stopping heating;

Step A105, continuing stirring until the temperature of the inorganic solid-phase combined powder falls to 115° C.;

Step A106, adding 120 grams of interface reaction active agent into the above inorganic solid-phase combined powder under the condition of 115° C. and 200 rpm, and then stirring for 2.5 minutes at 1300 rpm;

Step A107, adding 23700 grams of high polymer carrier section into the above mixture under the condition of 115° C. and 200 rpm, and then stirring for 5 minutes at 1300 rpm;

Step A108, adding 95 grams of oxidation-resistant and heat-resistant agent into the above mixture under the condition of 115° C. and 200 rpm, and then stirring for 2.5 minutes at 1300 rpm;

Step A109, adding 474 grams of dispersant into the above mixture under the condition of 115° C. and 200 rpm, and then stirring for 2.5 minutes at 1300 rpm;

Step A110, putting the above mixture into a water-cooled stirrer, cooling it by using indirect cooling water of 28° C. of which the flow capacity is 3 tons per hour so as to make the mixture be cooled to 30° C.;

Step A111, adding the cooled mixture into a twin-screw extruder, squeezing it to be strip at 220° C., and cooling in water bath at 30° C. to form master batch; and Step A112, putting the master batch into a drum dryer, drying at 110° C., and executing a vacuum balance for 3 hours with a vacuum degree of 0.8 kilograms to make the weight proportion of the water in the master batch be five per ten thousand, and then bagging and sealing for using.

A second embodiment of the method for manufacturing the master batch according to the present invention includes the following steps.

Step A201, putting 8000 grams of the inorganic solid-phase combined powder into an oven, venting air to dry the inorganic solid-phase combined powder at 115° C. for 60 minutes, venting air to dry the inorganic solid-phase combined powder at 125° C. for 60 minutes and then venting air to dry the inorganic solid-phase combined powder at 135° C. for 120 minutes in sequence;

Step A202, putting the above inorganic solid-phase combined powder after being dewatered and activated into a stirrer directly;

Step A203, heating the inorganic solid-phase combined powder to 140° C.;

Step A204, stirring for 5 minutes under a condition of 140° C. and 1300 rpm and then stopping heating;

Step A205, continuing stirring until the temperature of the inorganic solid-phase combined powder falls to 120° C.;

Step A206, adding 320 grams of interface reaction active agent into the above inorganic solid-phase combined powder under the condition of 120° C. and 200 rpm, and then stirring for 3 minutes at 1300 rpm;

Step A207, adding 20700 grams of high polymer carrier section into the above mixture under the condition of 120° C. and 200 rpm, and then stirring for 6 minutes at 1300 rpm;

Step A208, adding 103 grams of oxidation-resistant and heat-resistant agent into the above mixture under the condition of 120° C. and 200 rpm, and then stirring for 3 minutes at 1300 rpm;

Step A209, adding 828 grams of dispersant into the above mixture under the condition of 120° C. and 200 rpm, and then stirring for 3 minutes at 1300 rpm;

Step A210, putting the above mixture into a water-cooled stirrer, cooling it by using indirect cooling water of 29° C. of which the flow capacity is 3 tons per hour so as to make the mixture be cooled to 32° C.;

Step A211, adding the cooled mixture into a twin-screw extruder, squeezing it to be strip at 240° C., and cooling in water bath at 34° C. to form master batch; and Step A212, putting the master batch into a drum dryer, drying at 120° C., and executing a vacuum balance for 2.5 hours with a vacuum degree of 0.8 kilograms to make the weight proportion of the water in the master batch be three per ten thousand, and then bagging and sealing for using.

A third embodiment of a method for manufacturing the master batch according to the present invention includes the following steps.

Step A301, putting 10500 grams of the inorganic solid-phase combined powder into an oven, venting air to dry the inorganic solid-phase combined powder at 120° C. for 50 minutes, venting air to dry the inorganic solid-phase combined powder at 130° C. for 50 minutes and then venting air to dry the inorganic solid-phase combined powder at 140° C. for 110 minutes in sequence;

Step A302, putting the above inorganic solid-phase combined powder after being dewatered and activated into a stirrer directly;

Step A303, heating the inorganic solid-phase combined powder to 150° C.;

Step A304, stirring for 4 minutes under a condition of 150° C. and 1300 rpm and then stopping heating;

Step A305, continuing stirring until the temperature of the inorganic solid-phase combined powder falls to 125° C.;

Step A306, adding 630 grams of interface reaction active agent into the above inorganic solid-phase combined powder under the condition of 125° C. and 200 rpm, and then stirring for 3.5 minutes at 1300 rpm;

Step A307, adding 17700 grams of high polymer carrier section into the above mixture under the condition of 125° C. and 200 rpm, and then stirring for 7 minutes at 1300 rpm;

Step A308, adding 106 grams of oxidation-resistant and heat-resistant agent into the above mixture under the condition of 125° C. and 200 rpm, and then stirring for 3.5 minutes at 1300 rpm;

Step A309, adding 1062 grams of dispersant into the above mixture under the condition of 125° C. and 200 rpm, and then stirring for 3.5 minutes at 1300 rpm;

Step A310, putting the above mixture into a water-cooled stirrer, cooling it by using indirect cooling water of 30° C. of which the flow capacity is 3 tons per hour so as to make the mixture be cooled to 34° C.;

Step A311, adding the cooled mixture into a twin-screw extruder, squeezing it to be strip at 265° C., and cooling in water bath at 38° C. to form master batch; and Step A312, putting the master batch into a drum dryer, drying at 130° C., and executing a vacuum balance for 2 hours with a vacuum degree of 0.8 kilograms to make the weight proportion of the water in the master batch be one per ten thousand, and then bagging and sealing for using.

In the first embodiment, the second embodiment and the third embodiment of the method for manufacturing the master batch according to the present invention, the inorganic solid-phase combined powder is any one of the first embodiment, the second embodiment and the third embodiment of the inorganic solid-phase combined powder. The interface reaction active agent is preferably a silane-terminated coupling agent. The high polymer carrier section may be a nylon dry section, a polypropylene section or a polyester dry section. The oxidation-resistant and heat-resistant agent may be trialkyl phosphite. The dispersant is preferably macromolecule wax.

The first embodiment of the master batch according to the present invention

The master batch includes the following constituents in percentage by weight: 20% inorganic solid-phase combined powder and 79% high polymer carrier section.

A condition of a fiber manufactured by using the above first embodiment of the master batch is shown in Table 1.

TABLE 1

A condition of a fiber manufactured by using the above first embodiment of the master batch

| fiber number dtex | fiber relative tensile value CN/dtex | fiber elongation percentage | fiber elastic elongation percentage | fiber elastic stable rate | fiber spinnability | ultraviolet ray blocking rate | fiber anti-bacterial rate % | | |
|---|---|---|---|---|---|---|---|---|---|
| | | | | | | | *staphylococcus aureus* anti-bacterial rate | *escherichia coli* anti-bacterial rate | *candida albicans* anti-bacterial rate |
| 70 | 3.7 | 36.37% | 40.50% | 42.01% | Very Good | 99.12% | 99.50% | 99.80% | 95.30% |

The second embodiment of the master batch according to the present invention master batch includes the following constituents in percentage by weight: 27% inorganic solid-phase combined powder and 73% high polymer carrier section.

A condition of a fiber manufactured by using the above second embodiment of the master batch is shown in Table 2.

TABLE 2 a condition of a fiber manufactured by using the above second embodiment of the master batch

| fiber number dtex | fiber relative tensile value CN/dtex | fiber elongation percentage | fiber elastic elongation percentage | fiber elastic stable rate | fiber spinnability | ultraviolet ray blocking rate | fiber anti-bacterial rate % | | |
|---|---|---|---|---|---|---|---|---|---|
| | | | | | | | *staphylococcus aureus* anti-bacterial rate | *escherichia coli* anti-bacterial rate | *candida albicans* anti-bacterial rate |
| 76 | 3.5 | 32.10% | 39.12% | 40.90% | Good | 99.75% | 99.95% | 99.98% | 99.50% |

The third embodiment of the master batch according to the present invention

The master batch includes the following constituents in percentage by weight: 35% inorganic solid-phase combined powder and 64% high polymer carrier section.

A condition of a fiber manufactured by using the above third embodiment of the master batch is shown in Table 3.

TABLE 3

A condition of a fiber manufactured by using the above third embodiment of the master batch

| | fiber | | | | | fiber | fiber antibacterial rate % | | |
|---|---|---|---|---|---|---|---|---|---|
| fiber number dtex | relative tensile value CN/dtex | fiber elongation percentage | fiber elastic elongation percentage | fiber elastic stable rate | fiber spinnability | ultraviolet ray blocking rate | *staphylococcus aureus* ant-ibacterial rate | *escherichia coli* anti-bacterial rate | *candida albicans* anti-bacterial rate |
| 76 | 2.9 | 28.76% | 33.52% | 35.85% | General | 99.80% | 99.52% | 99.89% | 99.45% |

In the first embodiment, the second embodiment and the third embodiment of the master batch according to the present invention, the master batch is a master batch manufactured by any one method of the first embodiment, the second embodiment and the third embodiment of the method for manufacturing the master batch according to the present invention.

It can be seen from the above technology solutions of the first embodiment, the second embodiment and the third embodiment of the method for manufacturing the master batch, and the first embodiment, the second embodiment and the third embodiment of the master batch that compared with the prior art, the present invention firstly dewaters and activates the inorganic solid-phase combined powder at a high temperature, stirs at a high temperature and a high speed immediately and then selects suitable interface reaction agent to make the surface of inorganic solid-phase combined powder particles be covered, so as to make a wrap angle between the high polymer and particle extremely small, which advances dispersion of the inorganic solid-phase combined powder particles in organic macromolecule. Subsequently, a pathwise double-screw and a multilayer composite mixing facility lying before screw die head are adopted to execute a mixing process by a mode of multiway diffluence with a high melting pressure, which enhances the functions of kneading, cutting and multiple-direction distributary on the inorganic solid-phase nanometer powder in the high polymer melt, so as to accomplish a high dispersion degree. Finally, high quality organic dispersant is adopted to further disperse, by adopting enhanced dispersing means for many times, enables the inorganic solid-phase combined powder to be dispersed adequately in organic macromolecule, and when the formed master batch is continuously and quantificationally added into spinning section to be spinned, it could be avoided to produce melt adhesive particles in the melt, which makes high-speed spinning of functional fiber be executed smoothly. The oxidation-resistant and heat-resistant agent is added to prevent molecule weight of the high polymer from reducing, and enables relative viscosity of the master batch to reduce only 0.2-0.3. Then the master batch is added into spinning melt, the total viscosity does not influence optimal liquidity of spinning by using special spinning techniques so as to spin smoothly at a spinning speed of 4300 meters/minutes.

Figure 5:
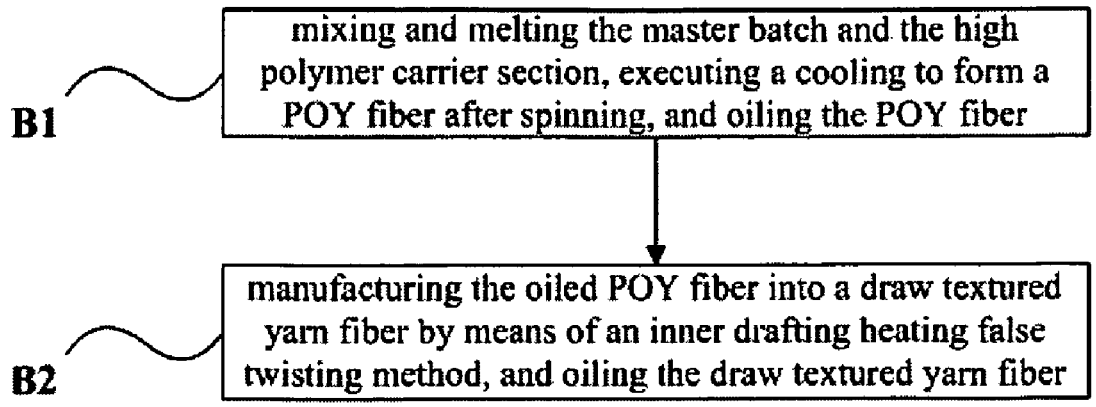
FIG. 5 is a flow chart of a method for manufacturing the fiber according to the present invention.

FIG. 5 is a flow chart of a method for manufacturing the fiber according to the present invention, and the method specifically includes the following steps:

Step B1, mixing and melting the master batch and the high polymer carrier section, executing a cooling to form a high-speed spinning pre-oriented yarn fiber after spinning, and oiling the high-speed spinning pre-oriented yarn fiber; and Step B2, manufacturing the oiled high-speed spinning pre-oriented yarn fiber into a draw textured yarn fiber by means of an inner drafting heating false twisting method, and oiling the draw textured yarn fiber.

Figure 6:
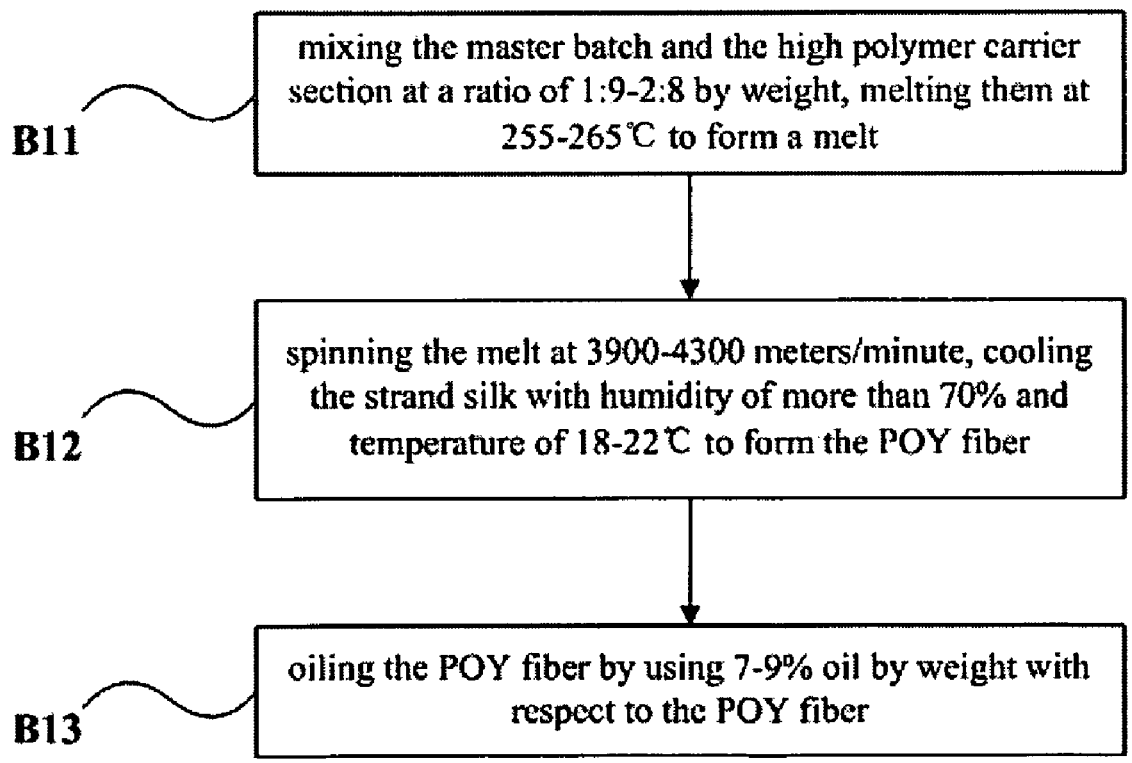
FIG. 6 is a flow chart of mixing and melting the master batch and the high polymer carrier section, cooling to form the high-speed spinning pre-oriented yarn fiber after spinning, and oiling the high-speed spinning pre-oriented yarn fiber according to the present invention.

FIG. 6 is a flow chart of mixing and melting the master batch and the high polymer carrier section, cooling to form the high-speed spinning pre-oriented yarn fiber after spinning, and oiling the high-speed spinning pre-oriented yarn fiber according to the present invention. In the technology solution shown in FIG. 5, the step B1 specifically includes the following steps:

Step B11, mixing the master batch and the high polymer carrier section at a ratio of 1:9-2:8 by weight, melting them at 255-265° C. to form a melt;

Step B12, spinning the melt at 3900-4300 meters/minute, cooling the strand silk with humidity of more than 70% and temperature of 18-22° C. to form the high-speed spinning pre-oriented yarn fiber; and Step B13, oiling the high-speed spinning pre-oriented yarn fiber by using 7-9% oil by weight with respect to the high-speed spinning pre-oriented yarn fiber.

The first embodiment of the method for manufacturing the fiber according to the present invention Step B101, mixing the master batch and the high polymer carrier section at a ratio of 1:9 by weight, melting them at 260° C. to form a melt;

Step B102, spinning the melt at 4300 meters/minute, cooling the strand silk with humidity of 75% and temperature of 20° C. to form the high-speed spinning pre-oriented yarn fiber;

Step B103, oiling the high-speed spinning pre-oriented yarn fiber by using 8% oil by weight with respect to the high-speed spinning pre-oriented yarn fiber; and Step B104, drafting the oiled high-speed spinning pre-oriented yarn fiber with draft multiple of 1.55, manufacturing the draw textured yarn fiber by means of a heating false twisting texturing method with D/Y ratio of 15, oiling the draw textured yarn fiber by using 3% oil by weight with respect to the draw textured yarn at a spinning speed of 700 meters/minute.

The second embodiment of the method for manufacturing the fiber according to the present invention Step B201, mixing the master batch and the high polymer carrier section at a ratio of 1.5:8.5 by weight, melting them at 255° C. to form a melt;

Step B202, spinning the melt at 3900 meters/minute, cooling the strand silk with humidity of 71% and temperature of 18° C. to form the high-speed spinning pre-oriented yarn fiber;

Step B203, oiling the high-speed spinning pre-oriented yarn fiber by using 7% oil by weight with respect to the high-speed spinning pre-oriented yarn fiber; and Step B204, drafting the oiled high-speed spinning pre-oriented yarn fiber with draft multiple of 1.5, manufacturing the draw textured yarn fiber by means of a heating false twisting texturing method with D/Y ratio of 14, oiling the draw textured yarn fiber by using 2.5% oil by weight with respect to the draw textured yarn at a spinning speed of 650 meters/minute.

The third embodiment of the method for manufacturing the fiber according to the present invention Step B301, mixing the master batch and the high polymer carrier section at a ratio of 2:8 by weight, melting them at 265° C. to form a melt;

Step B302, spinning the melt at 4100 meters/minute, and then cooling the strand silk with humidity of 80% and temperature of 22° C. to form the high-speed spinning pre-oriented yarn fiber;

Step B303, oiling the high-speed spinning pre-oriented yarn fiber by using 9% oil by weight with respect to the high-speed spinning pre-oriented yarn fiber; and Step B304, drafting the oiled high-speed spinning pre-oriented yarn fiber with draft multiple of 1.6, manufacturing the draw textured yarn fiber by means of a heating false twisting texturing method with D/Y ratio of 16, oiling the draw textured yarn fiber by using 3.5% oil by weight with respect to the draw textured yarn at a spinning speed of 750 meters/minute.

The first embodiment, the second embodiment and the third embodiment of the method for manufacturing the fiber according to the present invention adopts master batch in any one of the first embodiment, the second embodiment and the third embodiment of the master batch according to the present invention. The high polymer carrier section may be a nylon dry section, a polypropylene section or polyester dry section.

The first embodiment of the fiber according to the present invention

The fiber includes the following constituents in percentage by weight: 10% master batch and 90% high polymer carrier section.

The second embodiment of the fiber according to the present invention

The fiber includes the following constituents in percentage by weight: 15% master batch and 85% high polymer carrier section.

The third embodiment of the fiber according to the present invention

The fiber includes the following constituents in percentage by weight: 20% master batch and 80% high polymer carrier section.

In the first embodiment, the second embodiment and the third embodiment of the fiber, the fiber is a fiber manufactured by adopting any one method of the first embodiment, the second embodiment and the third embodiment of the method for manufacturing the fiber according to the present invention.

It can be seen from technology solutions of the first embodiment, the second embodiment and the third embodiment of the method for manufacturing the fiber, and from technology solutions of the first embodiment, the second embodiment and the third embodiment of the fiber that, compared with the prior art, the fiber of the present invention has a good spinnability, and by detecting, indexes such as fiber number, fiber relative tensile value, fiber elongation percentage, fiber elastic elongation percentage and fiber elastic stable rate of the fiber are consistent with the first class quality in national professional standard of fibers. The water absorption, permeability, dyeing evenness and electrical conductivity of the fiber in the present invention are improved greatly, and the drapability and comfortableness are increased when the textile of the fiber is worn. In addition, the fiber of the present invention could be taken as fiber material of textiles such as weaving cloth (including shuttle or non-shuttle weaving cloth) and warp knitting cloth. The fiber could be used separately, and could be interwoven by combining with gauze and fibers such as cotton, hemp and artificial cotton at a certain ratio.

Silver content in the fiber of the present invention can reach up to 3-10%, the bactericidal rate is high. The bactericidal rate against the negative bacteria and the positive bacteria, especially the bactericidal rate against the fungus represented by *candida albicans* may reach over 99.5%. The blocking rate against the ultraviolet ray with 200-400 nm wavelength may reach over 99.8%. The bactericidal rate and ultravioresistant efficacy of the fiber is perdurable and safe, and there is no toxic or side effects. The fiber has a good spinnability, and by detecting, indexes such as fiber number, fiber relative tensile value, fiber elongation percentage, fiber elastic elongation percentage and fiber elastic stable rate of the fiber are consistent with the first class quality in national professional standard of fibers. The water absorption, permeability, dyeing evenness and electrical conductivity of the fiber are improved greatly, and the drapability and comfortableness are increased when the textile of the fiber is worn. In addition, the fiber of the present invention could be taken as fiber material of textiles such as weaving cloth (including shuttle or non-shuttle weaving cloth) and warp knitting cloth. The fiber could be used separately, and could be interwoven by combining with gauze and fibers such as cotton, hemp and artificial cotton at a certain ratio.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. An inorganic solid-phase combined powder, comprising the following constituents in percentage by weight: 13-16% titanium compound, 16-18% silicon compound, 15-22% zinc compound and 49-51% silver compound.

2. The inorganic solid-phase combined powder according to claim 1, wherein the titanium compound is titanium dioxide with 15% by weight; the silicon compound is silicon dioxide with 17% by weight; the zinc compound is zinc oxide with 18% by weight; and the silver compound is silver nitrate with 50% by weight.

3. A master batch using the inorganic solid-phase combined powder according to claim 1, comprising the following constituents in percentage by weight: 20-35% the inorganic solid-phase combined powder and 64-79% high polymer carrier section.

4. The master batch according to claim 3, wherein the high polymer carrier section is a nylon dry section, a polypropylene section or a polyester dry section.

5. A fiber using the master batch according to claim 3, comprising the following constituents in percentage by weight: 10-20% the master batch and 80-90% the high polymer carrier section.

6. The fiber according to claim 5, wherein the weight percentage of the master batch is 10%, the weight percentage of the high polymer carrier section is 90%.

7. The fiber according to claim 5, wherein the high polymer carrier section is a nylon dry section, a polypropylene section or a polyester dry section.

* * * * *